US011869429B2

(12) United States Patent
Qiu

(10) Patent No.: US 11,869,429 B2
(45) Date of Patent: Jan. 9, 2024

(54) DISPLAY PANEL AND DRIVING METHOD THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventor: Yuanyou Qiu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/786,158

(22) PCT Filed: Aug. 4, 2021

(86) PCT No.: PCT/CN2021/110674

§ 371 (c)(1),
(2) Date: Jun. 16, 2022

(87) PCT Pub. No.: WO2022/068385

PCT Pub. Date: Apr. 7, 2022

(65) Prior Publication Data

US 2023/0222974 A1 Jul. 13, 2023

(30) Foreign Application Priority Data

Sep. 30, 2020 (CN) ......................... 202011060095.8

(51) Int. Cl.
*G09G 3/3233* (2016.01)

(52) U.S. Cl.
CPC ..... *G09G 3/3233* (2013.01); *G09G 2300/043* (2013.01); *G09G 2300/0426* (2013.01);
(Continued)

(58) Field of Classification Search
CPC ....... G09G 2300/0861; G09G 2310/08; G09G 2320/0209
See application file for complete search history.

(56) References Cited

U.S. PATENT DOCUMENTS

| | | | | |
|---|---|---|---|---|
| 6,307,681 B1 * | 10/2001 | Aoki | .................... | G09G 3/3648 345/94 |
| 8,144,114 B2 * | 3/2012 | Jeon | ..................... | G09G 3/3677 345/103 |

(Continued)

FOREIGN PATENT DOCUMENTS

| | | |
|---|---|---|
| CN | 107301850 A | 10/2017 |
| CN | 107564474 A | 1/2018 |

(Continued)

OTHER PUBLICATIONS

CN202011060095.8 first office action.
CN202011060095.8 second office action.
CN202011060095.8 Decision of Rejection.

*Primary Examiner* — Van N Chow
(74) *Attorney, Agent, or Firm* — IPro, PLLC

(57) ABSTRACT

Disclosed are a display panel, a driving method therefor, a display device. The display panel includes pixel circuits, data lines, write control lines, compensation control lines, a first driving circuit connected to compensation control lines, a second driving circuit connected to write control lines. Each column of pixel circuits corresponds to one data line, each row of pixel circuits corresponds to one write control line, one compensation control line. The first driving circuit outputs compensation control signals to pixel circuits by compensation control lines, second driving circuit outputs write control signals to pixel circuits by write control lines. The pulse width of compensation control signals is N times pulse width of write control signals, write control signals on two adjacent write control lines do not overlap, an overlap
(Continued)

time of compensation control signals on two adjacent compensation control lines is (N−1)/N of pulse width of compensation control signals.

19 Claims, 8 Drawing Sheets

(52) U.S. Cl.
CPC ............... *G09G 2300/0819* (2013.01); *G09G 2310/0202* (2013.01); *G09G 2310/0264* (2013.01); *G09G 2310/08* (2013.01)

(56) References Cited

U.S. PATENT DOCUMENTS

| | | | | |
|---|---|---|---|---|
| 8,587,578 | B2 | 11/2013 | Choi | |
| 8,878,760 | B2 * | 11/2014 | Kawabata ............ | G09G 3/3614 345/94 |
| 11,568,815 | B2 * | 1/2023 | Yu ........................ | G09G 3/3233 |
| 2004/0257349 | A1 * | 12/2004 | Kobayashi ........... | G09G 3/3648 345/204 |
| 2010/0188444 | A1 * | 7/2010 | Okuyama ............ | G09G 3/3648 345/694 |
| 2011/0157125 | A1 * | 6/2011 | Choi .................... | G09G 3/3233 315/160 |
| 2012/0139957 | A1 | 6/2012 | Choi | |
| 2019/0095016 | A1 | 3/2019 | Yang et al. | |
| 2020/0243021 | A1 | 7/2020 | Li et al. | |
| 2021/0210022 | A1 * | 7/2021 | Chang .................. | G09G 3/3275 |

FOREIGN PATENT DOCUMENTS

| | | | |
|---|---|---|---|
| CN | 109754753 | A | 5/2019 |
| CN | 209729473 | U | 12/2019 |
| CN | 112086071 | A | 12/2020 |
| KR | 101040806 | B1 | 6/2011 |

* cited by examiner

DISPLAY PANEL AND DRIVING METHOD THEREFOR, AND DISPLAY DEVICE

CROSS REFERENCE TO RELATED APPLICATIONS

The present application is a National Stage of International Application No. PCT/CN2021/110674, filed on Aug. 4, 2021, which claims the priority to Chinese Patent Application No. 202011060095.8, filed to the Chinese Patent Office on Sep. 30, 2020 and entitled "Display Panel and Driving Method therefor, and Display Device", both of which are incorporated in their entireties herein by reference.

FIELD

The present application relates to the technical field of display, in particular to a display panel and a driving method therefor, and a display device.

BACKGROUND

With a mainstream development tendency of a current display panel towards a high refresh frequency, the scheme design for a high refresh frequency is still limited. For example, when odd-even design is employed for a gate drive circuit, double data lines are required correspondingly, thereby resulting in an increase in the number of film layers in the display panel, an increase in the number of MASK processes, and further an increase in cost.

SUMMARY

Some embodiments of the present application provide a display panel, a driving method therefor, and a display device. A specific solution is as follows.

The display panel provided in an embodiment of the present application includes: a plurality of pixel circuits arranged in a matrix, a plurality of data lines, a plurality of write control lines, a plurality of compensation control lines, a first driving circuit connected to the plurality of compensation control lines, and a second driving circuit connected to the plurality of write control lines, where each column of pixel circuits corresponds to one data line, and each row of pixel circuits corresponds to one write control line and one compensation control line;

the pixel circuit includes: a driving transistor, a first switch transistor, a second switch transistor, a first capacitor and a second capacitor, where the first switch transistor is configured to short-circuit a gate electrode of the driving transistor and a second electrode of the driving transistor under control of the corresponding compensation control line; the second switch transistor is configured to write a signal of the corresponding data line to a first electrode of the driving transistor under control of the corresponding write control line; and the first capacitor is connected between the gate electrode of the driving transistor and a first power supply voltage end, and the second capacitor is connected between the first electrode of the driving transistor and the first power supply voltage end;

the first driving circuit is configured to output compensation control signals to each row of pixel circuits in sequence by means of the plurality of compensation control lines, and the second driving circuit is configured to output write control signals to each row of pixel circuits in sequence by means of the plurality of write control lines; and a pulse width of the compensation control signals is equal to N times a pulse width of the write control signals, the write control signals on two adjacent write control lines do not overlap, and an overlap time of the compensation control signals on two adjacent compensation control lines is equal to $(N-1)/N$ of the pulse width of the compensation control signals, N being an integer greater than 1.

Optionally, in the display panel provided in the present application, N is equal to 2.

Optionally, in the display panel provided in the present application, a ratio of a capacitance of the second capacitor to a capacitance of the first capacitor is greater than or equal to 0.5 and less than or equal to 1.5.

Optionally, in the display panel provided in the present application, a first electrode of the first switch transistor is connected to the gate electrode of the driving transistor, a second electrode of the first switch transistor is connected to the second electrode of the driving transistor, and a gate electrode of the first switch transistor is connected to the compensation control line; and a first electrode of the second switch transistor is connected to the data line, a second electrode of the second switch transistor is connected to the first electrode of the driving transistor, and a gate electrode of the second switch transistor is connected to the write control line.

Optionally, in the display panel provided in the present application, the display panel further includes a plurality of light-emitting control lines and a third driving circuit connected to the plurality of light-emitting control lines;

each light-emitting control line corresponds to one row of pixel circuits, and each pixel circuit further includes a third switch transistor and a fourth switch transistor;

a first electrode of the third switch transistor is connected to the first power supply voltage end, a second electrode of the third switch transistor is connected to the first electrode of the driving transistor, and a gate electrode of the third switch transistor is connected to the light-emitting control line;

a first electrode of the fourth switch transistor is connected to the second electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

Optionally, in the display panel provided in the present application, the display panel further includes a plurality of light-emitting control lines and a third driving circuit connected to the plurality of light-emitting control lines;

each light-emitting control line corresponds to one row of pixel circuits, and each pixel circuit further includes a third switch transistor and a fourth switch transistor;

a first electrode of the third switch transistor is connected to the first power supply voltage end, a second electrode of the third switch transistor is connected to the second electrode of the driving transistor, and a gate electrode of the third switch transistor is connected to the light-emitting control line;

a first electrode of the fourth switch transistor is connected to the first electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

Optionally, in the display panel provided in the present application, the pixel circuit further includes a fifth switch transistor;

a first electrode of the fifth switch transistor is connected to a first reset signal end, a second electrode of the fifth switch transistor is connected to the gate electrode of the driving transistor, and a gate electrode of the fifth switch transistor is connected to a first reset control end; and a first reset control end of the nth row of pixel circuits is connected to the write control line corresponding to the (n−1)th row of pixel circuits.

Optionally, in the display panel provided in the present application, the pixel circuit further includes a sixth switch transistor;

a first electrode of the sixth switch transistor is connected to a second reset signal end, a second electrode of the sixth switch transistor is connected to the anode of the light-emitting device, and a gate electrode of the sixth switch transistor is connected to a second reset control end; and a second reset control end of the nth row of pixel circuits is connected to the write control line corresponding to the (n−1)th row of pixel circuits, or the second reset control end of the nth row of pixel circuits is connected to the write control line corresponding to the nth row of pixel circuits.

Optionally, in the display panel provided in the present application, the first driving circuit includes a first driving sub-circuit and a second driving sub-circuit, the first driving sub-circuit is connected to an odd-numbered compensation control line; and the second driving sub-circuit is connected to an even-numbered compensation control line.

Correspondingly, an embodiment of the present application further provides a driving method for any one of the above display panels. The driving method includes: providing, by a second driving circuit, write control signals for an nth row to an (n+N−1)th row of pixel circuits row by row in a period in response to a first driving circuit providing a compensation control signal for the nth row of pixel circuits.

Correspondingly, an embodiment of the present application further provides a display device. The display device includes a control circuit and any one of the display panels provided in the embodiments of the present application; and the control circuit is connected to the display panel and is configured to control the display panel for display.

DETAILED DESCRIPTION OF THE EMBODIMENTS

Figure 1:
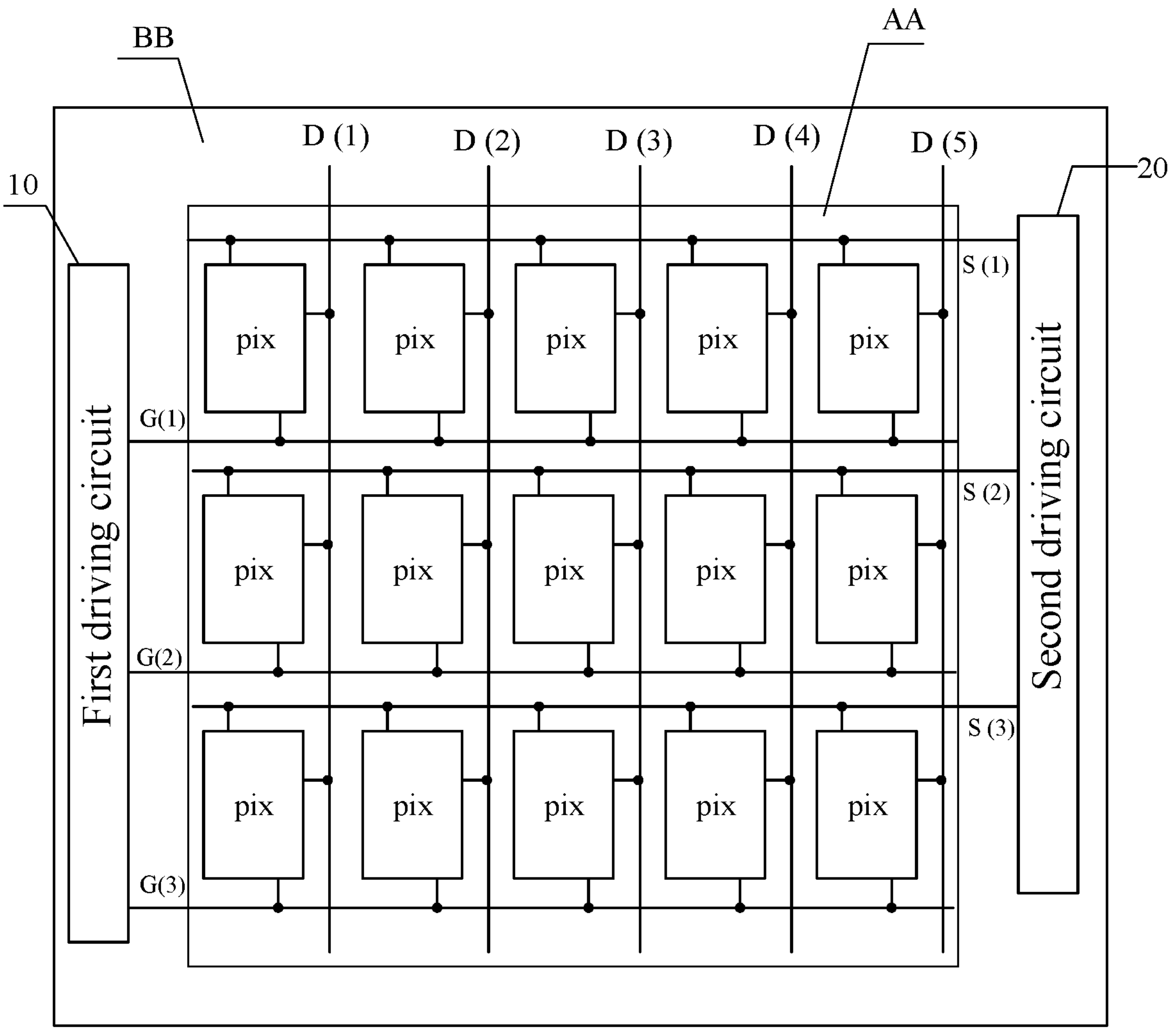
FIG. 1 is a structural schematic diagram of a display panel provided in an embodiment of the present application.

To make the foregoing objective, features, and advantages of the present application clearer and more comprehensible, the present application will be further described in detail below in conjunction with the accompanying drawings and embodiments. The illustrative implementation modes may be embodied in many forms and should not be construed as limited to the implementation modes set forth herein; rather, these implementation modes are provided so that the present application will be thorough and complete, and will fully convey the concept of the illustrative implementation modes to those skilled in the art. The same reference numerals in the drawings denote the identical or similar parts, and thus repeated descriptions thereof will be omitted. The words expressing positions and directions described in the present application are all illustrated by way of example in the accompanying drawings, but can also be changed according to needs, and all the changes are included in the scope of protection of the present application. The accompanying drawings of the present application are merely for purposes of illustrating relative positional relations and are not intended to represent true proportions.

It is noted that specific details are set forth in the following description to facilitate a thorough understanding of the present application. However, the present application can be practiced in many other ways than those described herein, and those skilled in the art may make similar developments without departing from the meaning of the present application. The application is therefore not to be limited to the specific implementation modes disclosed below. While the description follows to describe preferred implementation modes for practicing the present application, the description is intended to illustrate the general principles of the present application and is not intended to limit the scope of the present application. The scope of protection of the present application shall be governed by what is defined by the appended claims.

A display panel, a driving method therefor and a display device provided in embodiments of the present application are specifically explained in combination with accompanying drawings.

As shown in FIG. 1, the display panel provided in an embodiment of the present application includes: a plurality of pixel circuits pix arranged in a matrix, a plurality of data lines D (m), a plurality of write control lines S (n), a plurality of compensation control lines G (n), a first driving circuit 10 connected to the plurality of compensation control lines G (n), and a second driving circuit 20 connected to the plurality of write control lines S (n), where each column of pixel circuits pix corresponds to one data line D (m), and each row of pixel circuits pix corresponds to one write control line S (n) and one compensation control line G (n).

Figure 2:
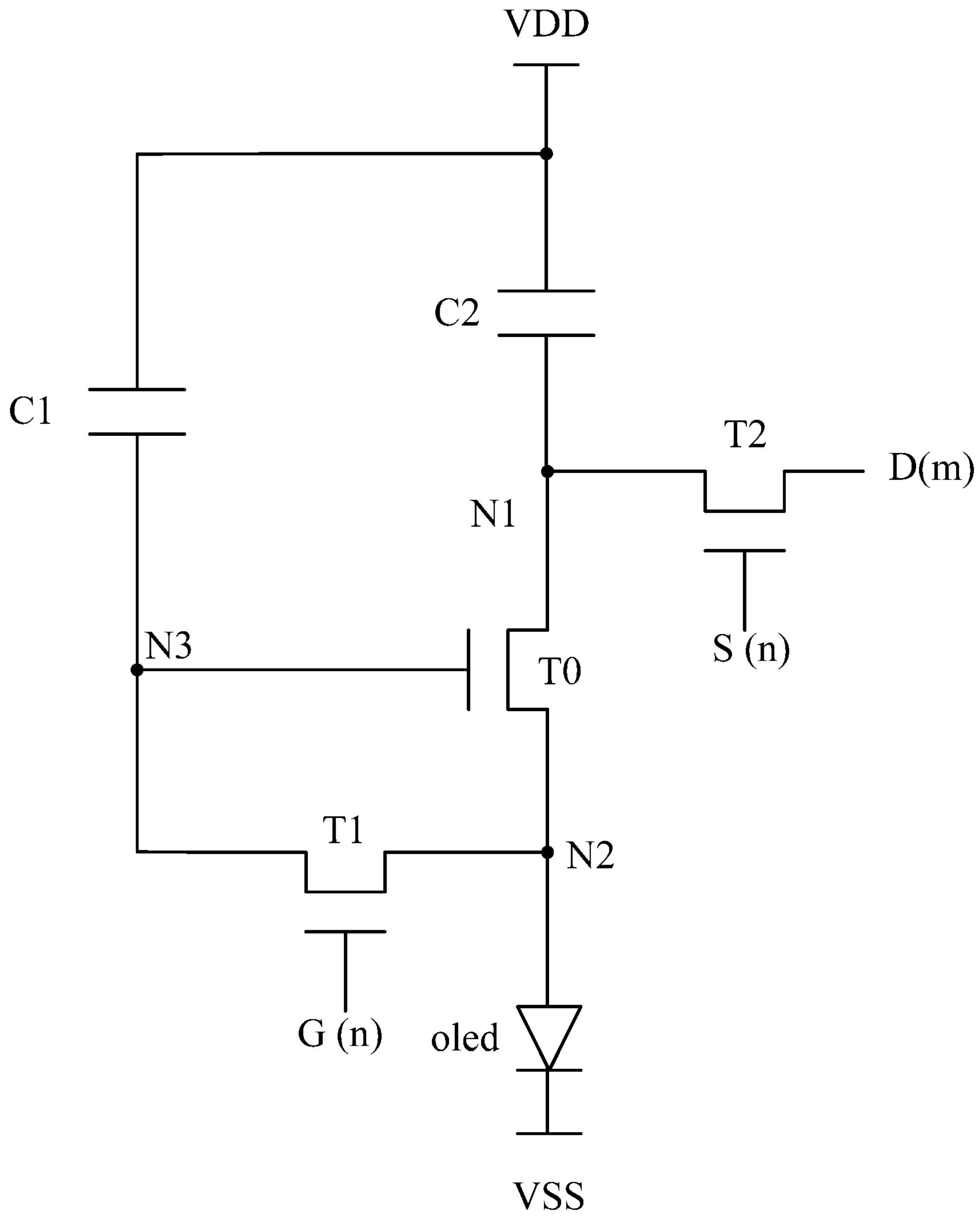
FIG. 2 is a structural schematic diagram of a pixel circuit provided in an embodiment of the present application.

As shown in FIG. 2, the pixel circuit pix includes: a driving transistor T0, a first switch transistor T1, a second switch transistor T2, a first capacitor C1 and a second capacitor C2, where the first switch transistor T1 is configured to short-circuit a gate electrode of the driving transistor T0 and a second electrode N2 of the driving transistor T0 under control of the corresponding compensation control line G (n); the second switch transistor T2 is configured to write a signal of the corresponding data line D (m) to a first electrode N1 of the driving transistor T0 under control of the corresponding write control line S (n); the first capacitor C1 is connected between the gate electrode of the driving transistor T0 and a first power supply voltage end VDD, and the second capacitor C2 is connected between the first electrode N1 of the driving transistor T0 and the first power supply voltage end VDD; and the first driving circuit 10 is configured to output compensation control signals to each row of pixel circuits pix in sequence by means of a plurality of compensation control lines G (n), and the second driving circuit 20 is configured to output write control signals to each row of pixel circuits pix in sequence by means of a plurality of write control lines S (n).

Figure 3:
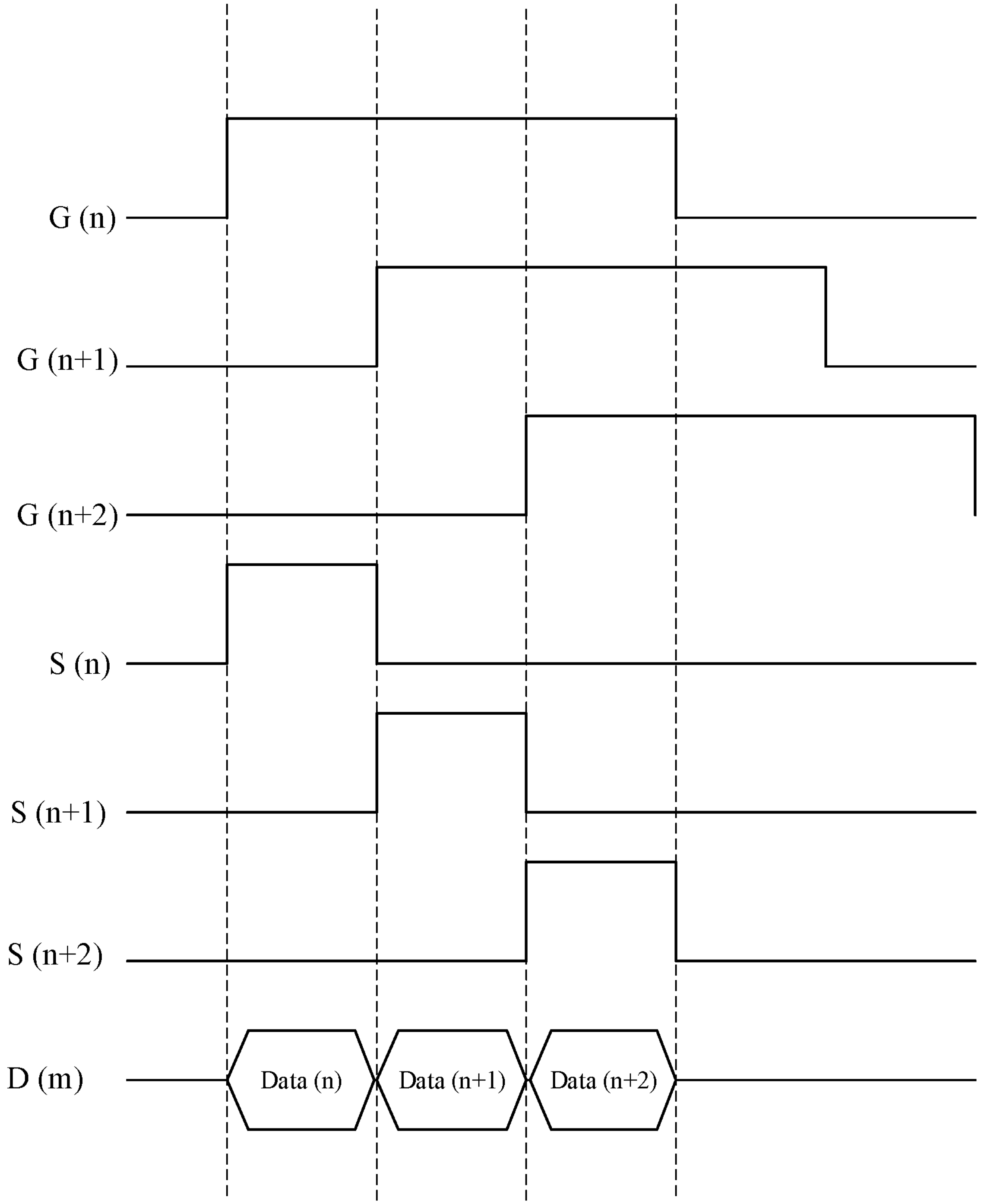
FIG. 3 is a circuit timing diagram corresponding to a pixel circuit provided in an embodiment of the present application.

As shown in FIG. 3, a pulse width of the compensation control signal on the compensation control line G (n) is equal to N times a pulse width of the write control signal on the write control line S (n), the write control signals on two adjacent write control lines S (n) do not overlap, and an overlap time of the compensation control signals on two adjacent compensation control lines G (n) is equal to (N−1)/N of the pulse width of the compensation control signals, N being an integer greater than 1, and FIG. 3 is explained by taking N=3 as an example.

In the present application, the compensation control line is configured to control the first switch transistor, and the second capacitor and the overlap time of the compensation control signals on the two adjacent compensation control lines may ensure that a node N3 of the pixel circuit has high refresh frequency on the basis of sufficient charging. In order to avoid data write dislocation during a charging overlap time of two adjacent rows of pixel circuits at the node N3, the pulse width of the compensation control signal for controlling the first switch transistor is equal N times the pulse width of the write control signal for controlling the second switch transistor, and the write control signals on two adjacent write control lines do not overlap, that is, although turn-on times of the first switch transistors of the two adjacent rows of pixel circuits overlap, turn-on times of the second switch transistors of the two adjacent rows of pixel circuits do not overlap, such that each row of pixel circuits only needs to correspond to one data line, and the number of film layers in the display panel and the number of MASK processes do not need to be increased, so as to save the cost.

In some embodiments of the present application, although the turn-on time of the first switch transistor is longer than the turn-on time of the second switch transistor in each pixel circuit, when the second switch transistor is turned on, the second capacitor may be used for charging, and when the second switch transistor is turned off, the second capacitor is used to continuously charge the node N3 by means of the switched-on first switch transistor, such that the node N3 is fully charged.

In some embodiments of, when the first switch transistor in the pixel circuit is turned on, the node N3 is charged with a voltage of a node N1, the voltage of the node N1 is provided by the second switch transistor, and when the second switch transistor is turned off, the voltage of the node N1 is maintained by the second capacitor. Thus, a capacitance of the second capacitor may not be too small or potential of the node N3 may not be maintained before the first switch transistor is turned off. Certainly, the capacitance of the second capacitor may not be too large or the potential of the node N3 may not reach an ideal value before the first switch transistor is turned off.

Therefore, optionally, in the display panel provided in the present application, a ratio of the capacitance of the second capacitor to the capacitance of the first capacitor is greater than or equal to 0.5 and less than or equal to 1.5, for example, the capacitance of the second capacitor is about equal to the capacitance of the first capacitor.

In the display panel provided in the present application, after the second switch transistor in the pixel circuit is turned off, the node N3 is charged by the second capacitor, and the second capacitor is discharged until the voltage to the node N2 is lower than the voltage of the node N3, and the N3 node may not continue to be charged by the second capacitor, such that the charging time of the node N3 by the second capacitor is limited. In order to avoid that discharge of the second capacitor ends before the first switch transistor is turned off, a difference between the pulse width of the compensation control signal and the pulse width of the write control signal may not be too large, optionally N=2 as shown in FIG. 4, that is, the pulse width of the compensation control signal is equal to 2 times the pulse width of the write control signal.

Figure 4:
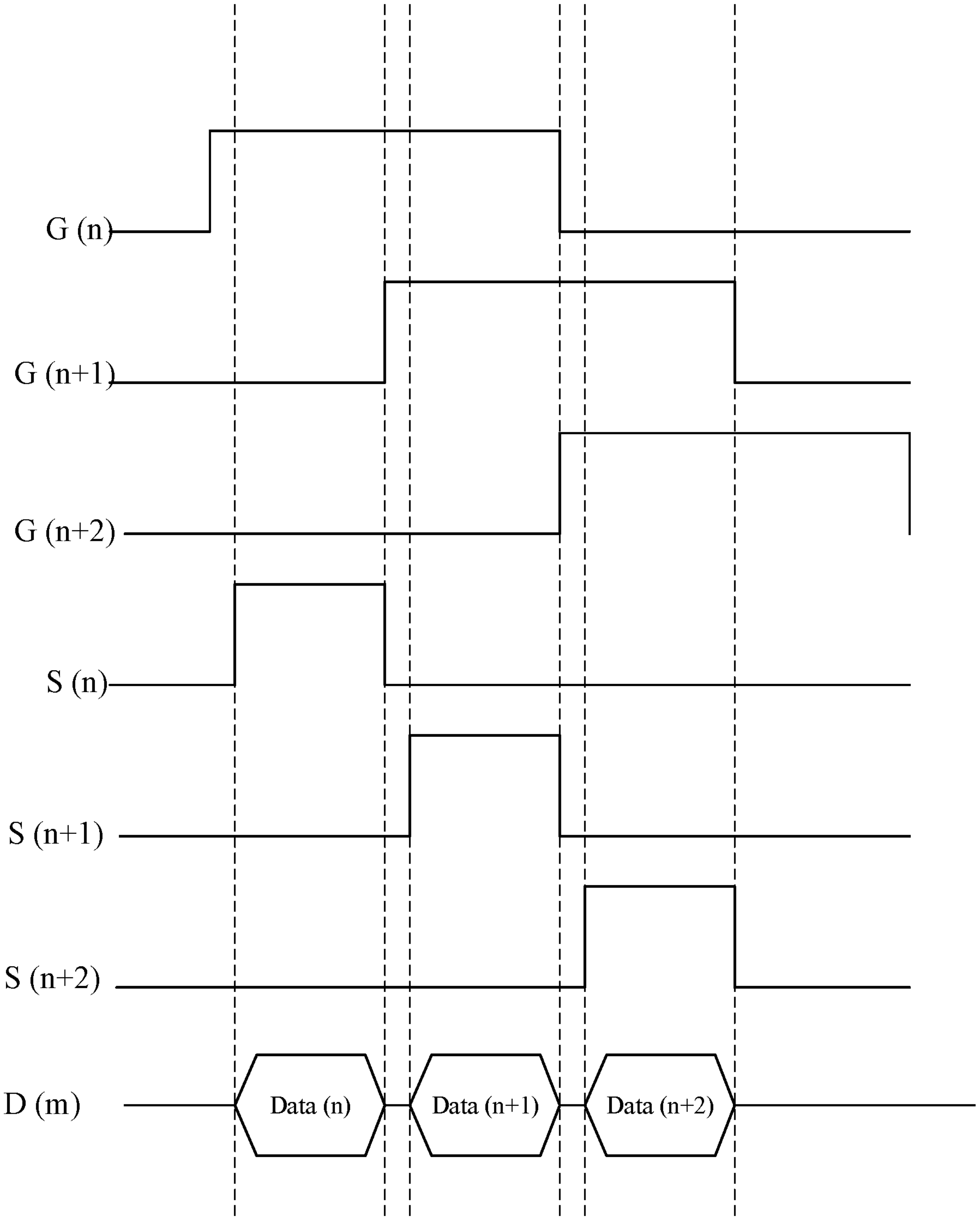
FIG. 4 is another circuit timing diagram corresponding to a pixel circuit provided in an embodiment of the present application.

Further, in the present application, the turn-on times of the second switch transistors in two adjacent rows of pixel circuits need to be staggered for a period of time, that is, as shown in FIG. 4, the write control signals on two adjacent write control lines S (n) do not overlap, so as to avoid data signal transmission dislocation on the data line D (m).

In some embodiments of the display panel provided in the present application, as shown in FIG. 2, a first electrode of the first switch transistor T1 is connected to the gate electrode of the driving transistor T0, a second electrode of the first switch transistor T1 is connected to the second electrode of the driving transistor T0, and a gate electrode of the first switch transistor T1 is connected to the compensation control line G (n); and a first electrode of the second switch transistor T2 is connected to the data line, a second electrode of the second switch transistor T2 is connected to the first electrode of the driving transistor T0, and a gate electrode of the second switch transistor T2 is connected to the write control line S (n).

It will be noted that the present application is applicable to any display panel with a pixel circuit structure as shown in FIG. 4. During specific implementation, in order to optimize the quality of the display panel, the pixel circuit further includes other devices generally.

Figure 5:
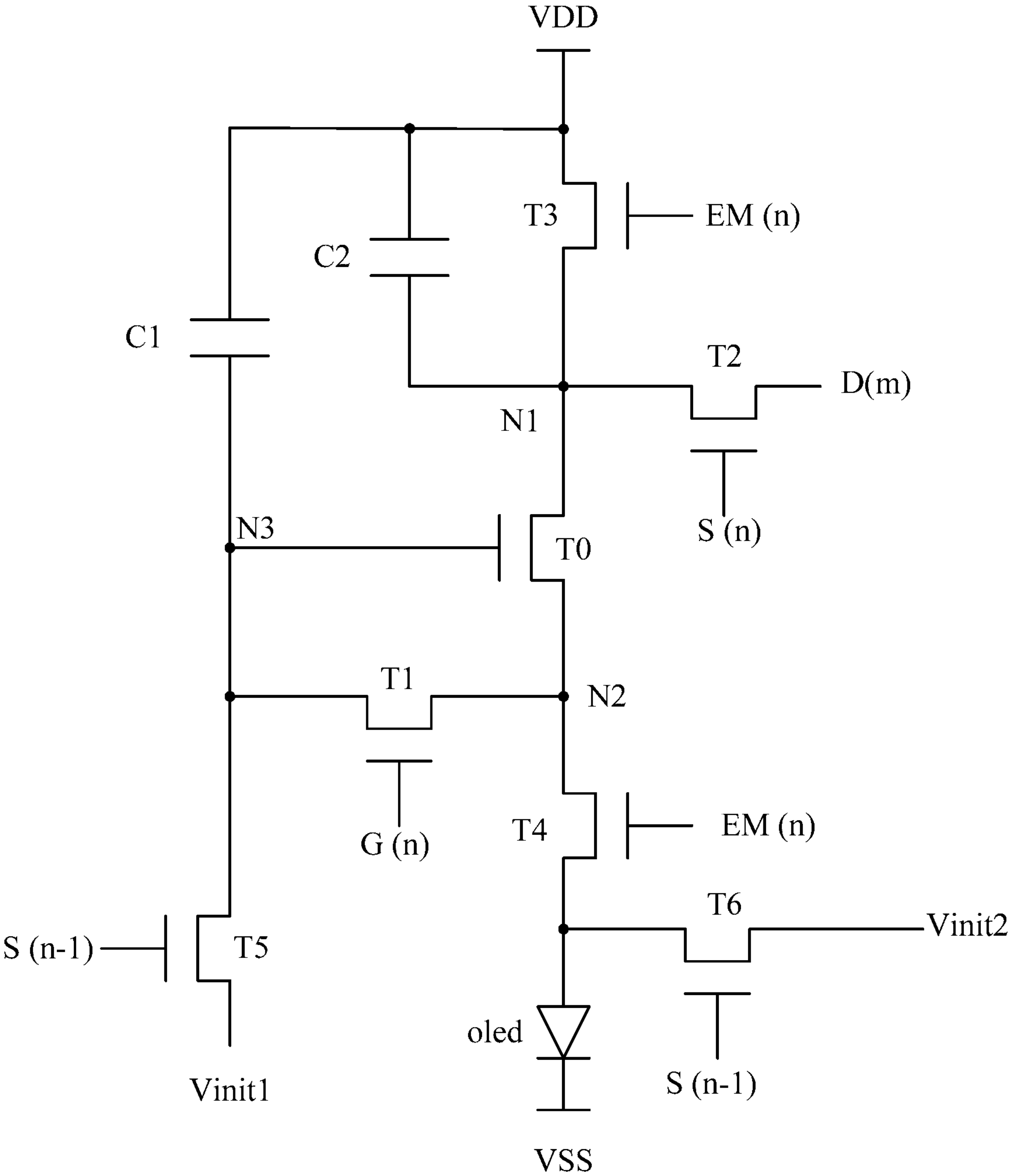
FIG. 5 is another structural schematic diagram of a pixel circuit provided in an embodiment of the present application.
Figure 6:
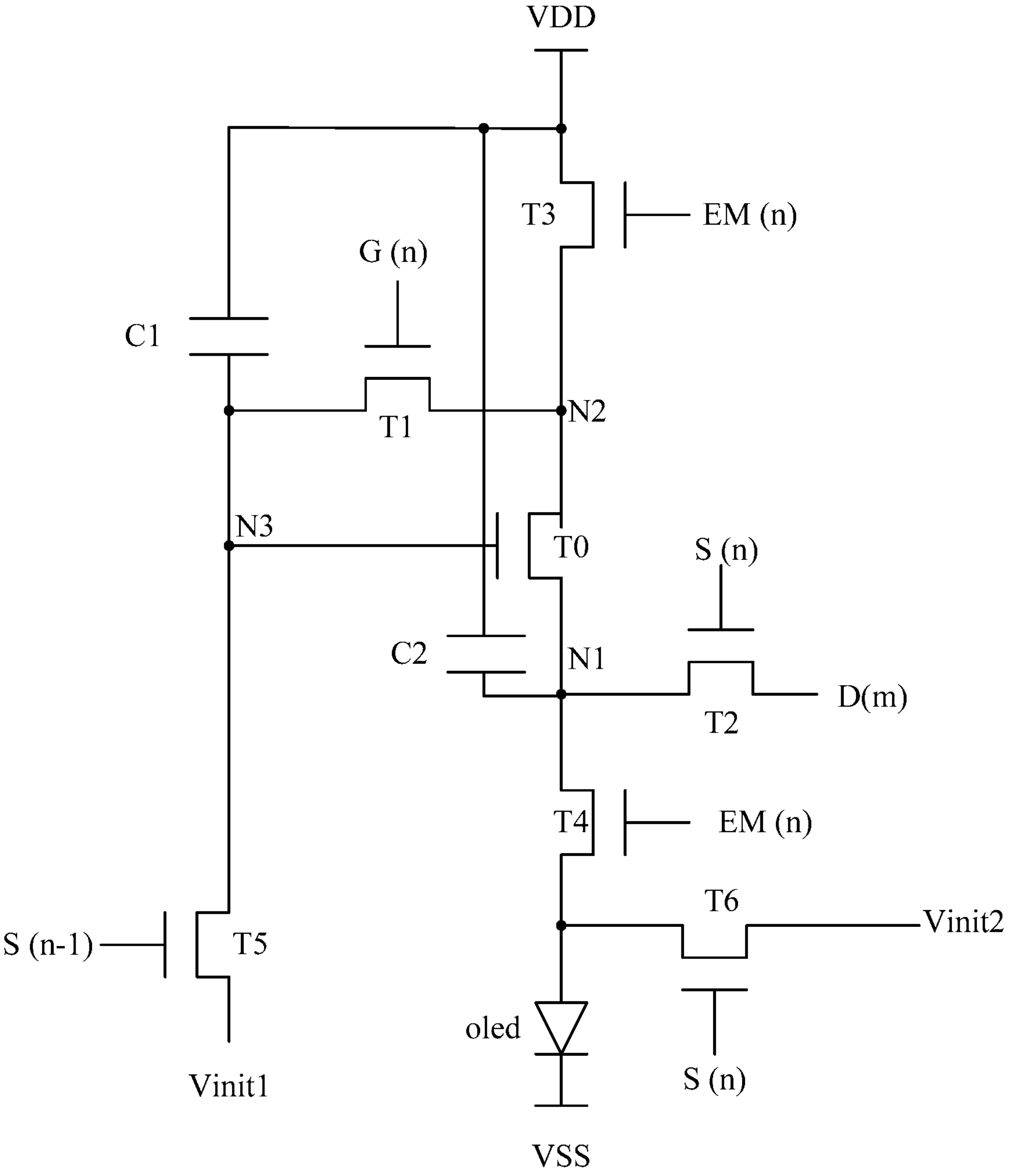
FIG. 6 is yet another structural schematic diagram of a pixel circuit provided in an embodiment of the present application.

In some embodiments of the display panel provided in the present application, the display panel further includes a plurality of light-emitting control lines and a third driving circuit connected to the plurality of light-emitting control lines; and each light-emitting control line corresponds to one row of pixel circuits, the third driving circuit is configured to output light-emitting control signals to each row of pixel circuits in sequence by means of the plurality of light-emitting control lines EM (n). As shown in FIGS. 5 and 6, the pixel circuit further includes a third switch transistor T3 and a fourth switch transistor T4.

As shown in FIG. 5, a first electrode of the third switch transistor T3 is connected to the first power supply voltage end VDD, a second electrode of the third switch transistor T3 is connected to the first electrode N1 of the driving transistor T0, and a gate electrode of the third switch transistor T3 is connected to the light-emitting control line EM (n); and a first electrode of the fourth switch transistor T4 is connected to the second electrode N2 of the driving transistor T0, a second electrode of the fourth switch transistor T4 is connected to an anode of a light-emitting device oled, and a gate electrode of the fourth switch transistor T4 is connected to the light-emitting control line EM (n).

Alternatively, as shown in FIG. 6, a first electrode of the third switch transistor T3 is connected to the first power supply voltage end VDD, a second electrode of the third switch transistor T3 is connected to the second electrode N2 of the driving transistor T0, and a gate electrode of the third switch transistor T3 is connected to the light-emitting control line EM (n); and a first electrode of the fourth switch transistor T4 is connected to the first electrode N1 of the driving transistor T0, a second electrode of the fourth switch transistor T4 is connected to an anode of a light-emitting device oled, and a gate electrode of the fourth switch transistor T4 is connected to the light-emitting control line EM (n).

Optionally, in the display panel provided in the present application, as shown in FIGS. 5 and 6, the pixel circuit further includes a fifth switch transistor T5;

- a first electrode of the fifth switch transistor T5 is connected to a first reset signal end Vinit1, a second electrode of the fifth switch transistor T5 is connected to the gate electrode of the driving transistor T0, and a gate electrode of the fifth switch transistor T5 is connected to a first reset control end; and
- a first reset control end of the nth row of pixel circuits is connected to the write control line S (n−1) corresponding to the (n−1)th row of pixel circuits.

Optionally, in the display panel provided in the present application, as shown in FIGS. 5 and 6, the pixel circuit further includes a sixth switch transistor T6; a first electrode of the sixth switch transistor T6 is connected to a second reset signal end Vinit2, a second electrode of the sixth switch transistor T6 is connected to the anode of the light-emitting device oled, and a gate electrode of the sixth switch transistor T6 is connected to a second reset control end; and as shown in FIG. 5, a second reset control end of the nth row of pixel circuits is connected to the write control line S (n—1) corresponding to the (n−1)th row of pixel circuits, or as shown in FIG. 6, the second reset control end of the nth row of pixel circuits is connected to the write control line S (n) corresponding to the nth row of pixel circuits.

Figure 7:
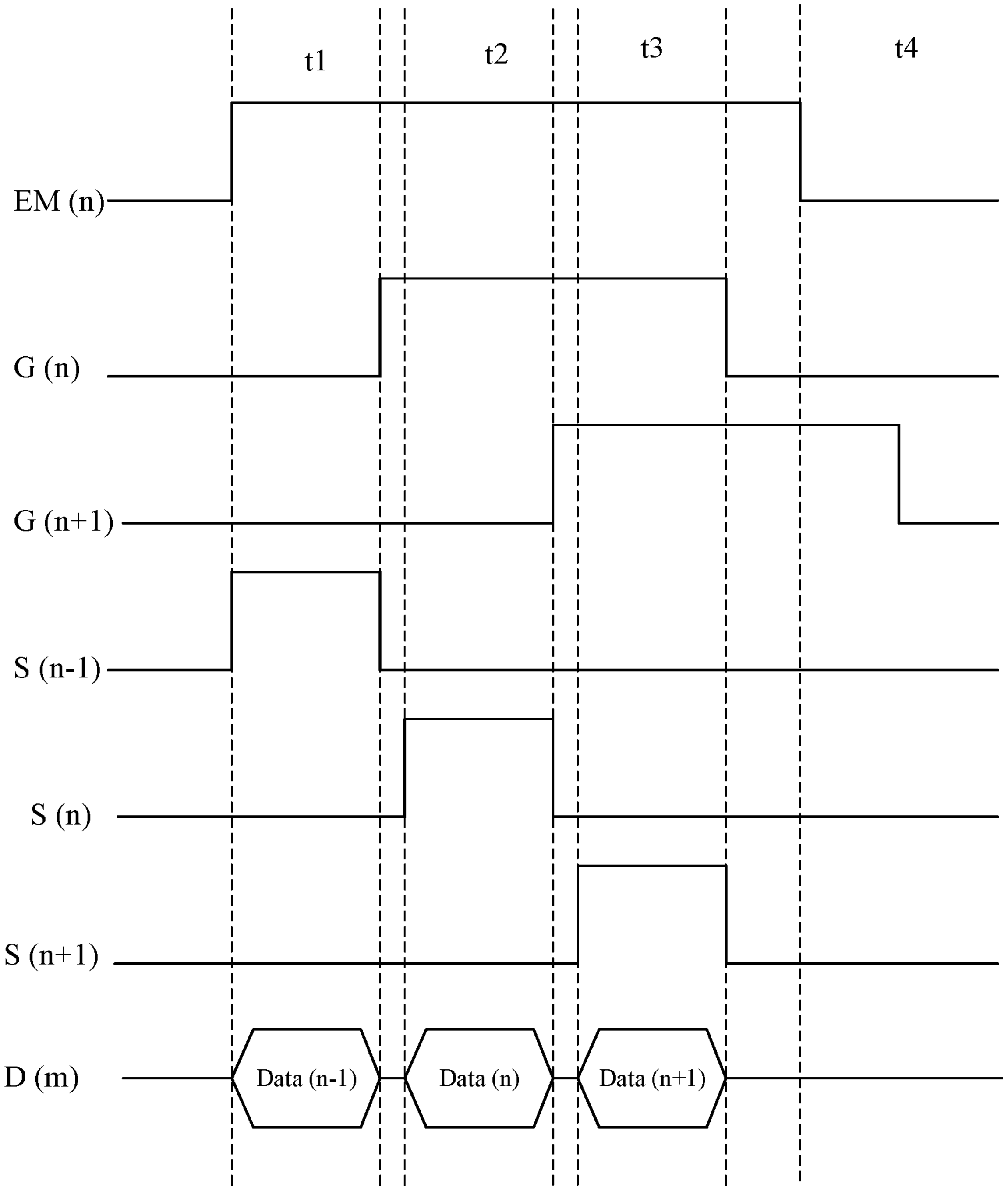
FIG. 7 is yet another circuit timing diagram corresponding to a pixel circuit provided in an embodiment of the present application.

In some embodiments, as an example of the pixel circuit shown in FIGS. 5 and 6, a corresponding timing diagram is shown in FIG. 7, and in a stage t1, the fifth switch transistor T5 is turned on, and the potential of the node N3 is Vinit1. FIG. 5 shows potential Vinit2 of the anode of the light-emitting device oled when the sixth switch transistor in the pixel circuit is turned on. In a stage t2, the first switch transistor T1, the second switch transistor T2 and the driving transistor T0 are turned on, the potential of the node N2 is VData (n), VData (n) is written to the node N3 by means of the driving transistor T0 and the first switch transistor T1, and VData (n) charges the second capacitor C2. FIG. 6 shows potential Vinit2 of the anode of the light-emitting device oled when the sixth switch transistor in the pixel circuit is turned on. In a stage t3, until the potential the node N3 becomes Vdata+Vth, the driving transistor T0 is turned off, and Vth is threshold voltage of the driving transistor T0. In this stage, under the condition that the capacitance of the second capacitor C2 is too small, the second capacitor C2 discharges rapidly and the node N3 is charged for a short time, and under the condition that the capacitance of the second capacitor C2 is too large, the second capacitor C2 discharges slowly and the potential of the node N3 may not be charged to Vdata+Vth. In a stage t4, the third switch transistor T3 and the fourth switch transistor T4 are turned off, the potential of the node N3 is still Vdata+Vth, the driving transistor T0 works in a saturation state, and according to saturation state current features, a working current $I_{oled}$ which flows through the driving transistor T0 and is used for driving the light-emitting device oled to emit light meets a formula: $I_{oled}$=K $(V_{gs}-Vth)^2$=K $[VData\ (n)+Vth-VDD-Vth]^2$=K $(VData\ (n)-VDD)^2$, where K is a structural parameter, and this value is stable in the same structure and may be counted as a constant.

During specific implementation, in the present application, as shown in FIG. 1, the display panel includes a display area AA and a bezel area BB, where the first driving circuit 10 and the second driving circuit 20 are both located in the rame area.

Figure 8:
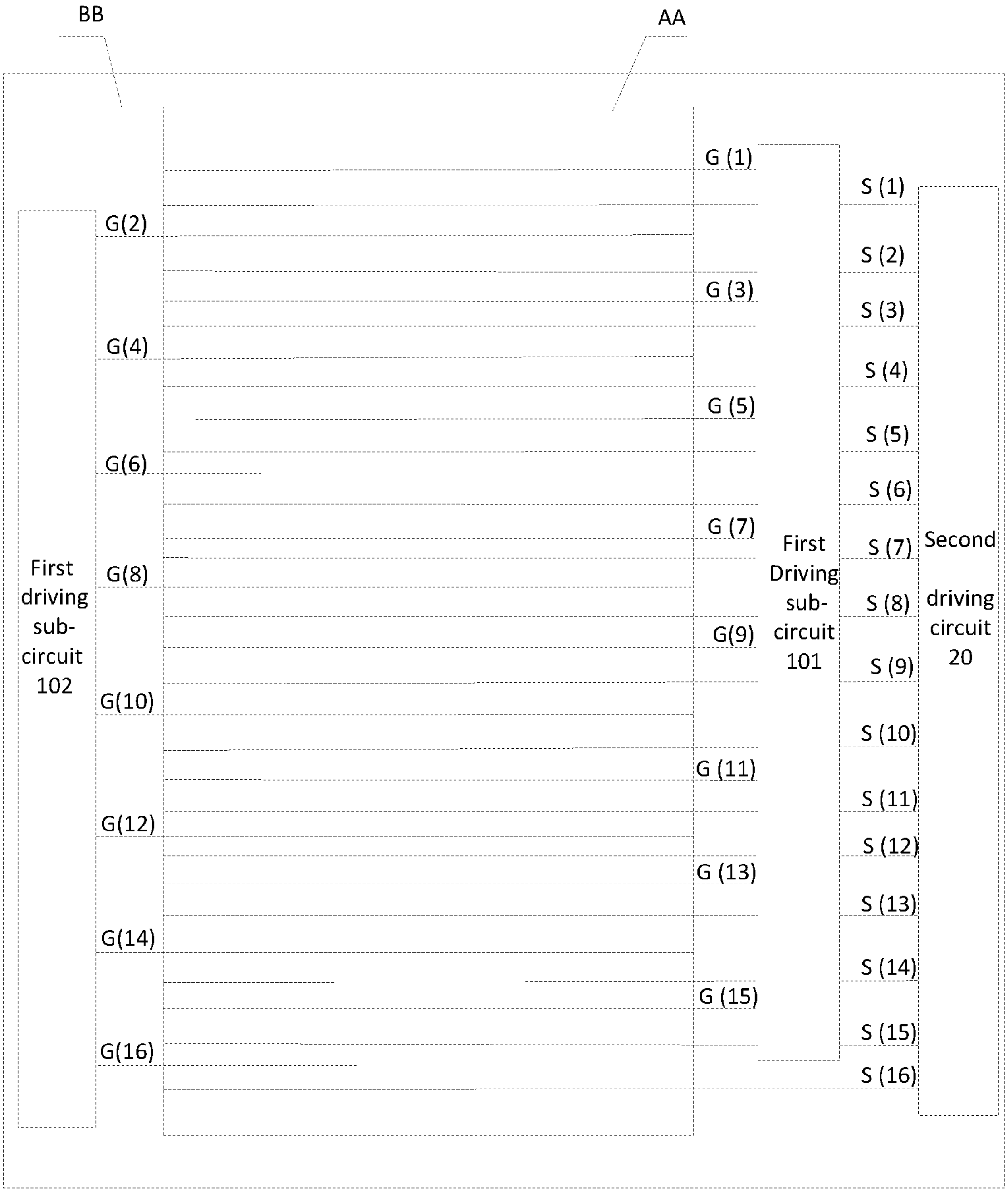
FIG. 8 is another structural schematic diagram of a display panel provided in an embodiment of the present application.

Optionally, in the display panel provided in the present application, as shown in FIG. 8, the first driving circuit includes a first driving sub-circuit 101 and a second driving sub-circuit 102, the first driving sub-circuit 101 is connected to an odd-numbered compensation control line G (n); and the second driving sub-circuit 102 is connected to an even-numbered compensation control line G (n). The first driving sub-circuit 101 and the second driving sub-circuit 102 are located on two sides of the compensation control line G (n) respectively.

Based on the same inventive concept, an embodiment of the present application further provides a driving method for any one of the above display panels. The driving method includes:

- providing, by the second driving circuit, write control signals for the nth row to the (n+N−1)th row of pixel circuits row by row when the first driving circuit provides the compensation control signal for the nth row of pixel circuits.

Based on the same inventive concept, an embodiment of the present application further provides a display device. The display device includes a control circuit and any one of the display panels provided in the embodiments of the present application; and the control circuit is connected to the display panel and is configured to control the display panel for display. The display device may be any product or part with a display function, for example, a mobile phone, a tablet personal computer, a television, a display, a notebook computer, a digital photo frame, a navigator, etc. The implementation of the display device may be referred to the embodiment of the display panel above, and the repetition is not repeated.

In the display panel and a driving method therefor, and a display device provided in the present application, the compensation control line is configured to control the first switch transistor, and the second capacitor and the overlap time of the compensation control signals on the two adjacent compensation control lines may ensure that a node N3 of the pixel circuit has high refresh frequency on the basis of sufficient charging. In order to avoid data write dislocation during a charging overlap time of two adjacent rows of pixel circuits at the node N3, the pulse width of the compensation control signal for controlling the first switch transistor is equal N times the pulse width of the write control signal for controlling the second switch transistor, and the write control signals on two adjacent write control lines do not overlap, that is, although turn-on times of the first switch transistors of the two adjacent rows of pixel circuits overlap, turn-on times of the second switch transistors of the two adjacent rows of pixel circuits do not overlap, such that each row of pixel circuits only needs to correspond to one data line, and the number of film layers in the display panel and the number of MASK processes do not need to be increased, so as to save the cost.

It will be apparent to those skilled in the art that various modifications and variations can be made to the present application without departing from the spirit and scope of the present application. Thus, it is intended that the present application cover such modifications and variations which come within the scope of the appended claims and their equivalents, as well.

What is claimed is:

1. A display panel, comprising: a plurality of pixel circuits arranged in a matrix, a plurality of data lines, a plurality of write control lines, a plurality of compensation control lines, a first driving circuit connected to the plurality of compensation control lines, and a second driving circuit connected to the plurality of write control lines, wherein each column of pixel circuits corresponds to one data line, and each row of pixel circuits corresponds to one write control line and one compensation control line;

the pixel circuit comprises: a driving transistor, a first switch transistor, a second switch transistor, a first capacitor and a second capacitor, wherein the first switch transistor is configured to short-circuit a gate electrode of the driving transistor and a second electrode of the driving transistor under control of a corresponding compensation control line; the second switch transistor is configured to write a signal of a corresponding data line to a first electrode of the driving transistor under control of a corresponding write control line; and the first capacitor is connected between the gate electrode of the driving transistor and a first power supply voltage end, and the second capacitor is connected between the first electrode of the driving transistor and the first power supply voltage end;

the first driving circuit is configured to output compensation control signals to each row of pixel circuits in sequence by means of the plurality of compensation control lines, and the second driving circuit is configured to output write control signals to each row of pixel circuits in sequence by means of the plurality of write control lines;

a pulse width of the compensation control signals is equal to N times a pulse width of the write control signals, the write control signals on two adjacent write control lines do not overlap, and an overlap time of the compensation control signals on two adjacent compensation control lines is equal to (N−1)/N of the pulse width of the compensation control signals, N being an integer greater than 1; and the compensation control signals and the write control signals loaded on a same row pixel circuits overlap.

2. The display panel according to claim 1, wherein N is equal to 2.

3. The display panel according to claim 1, wherein a ratio of a capacitance of the second capacitor to a capacitance of the first capacitor is greater than or equal to 0.5 and less than or equal to 1.5.

4. The display panel according to claim 1, wherein a first electrode of the first switch transistor is connected to the gate electrode of the driving transistor, a second electrode of the first switch transistor is connected to the second electrode of the driving transistor, and a gate electrode of the first switch transistor is connected to the compensation control line; and a first electrode of the second switch transistor is connected to the data line, a second electrode of the second switch transistor is connected to the first electrode of the driving transistor, and a gate electrode of the second switch transistor is connected to the write control line.

5. The display panel according to claim 1, further comprising a plurality of light-emitting control lines and a third driving circuit connected to the plurality of light-emitting control lines;

each light-emitting control line corresponds to one row of pixel circuits, and each pixel circuit further comprises a third switch transistor and a fourth switch transistor;

a first electrode of the third switch transistor is connected to the first power supply voltage end, a second electrode of the third switch transistor is connected to the first electrode of the driving transistor, and a gate electrode of the third switch transistor is connected to the light-emitting control line;

a first electrode of the fourth switch transistor is connected to the second electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

6. The display panel according to claim 1, further comprising a plurality of light-emitting control lines and a third driving circuit connected to the plurality of light-emitting control lines;

each light-emitting control line corresponds to one row of pixel circuits, and each pixel circuit further comprises a third switch transistor and a fourth switch transistor;

a first electrode of the third switch transistor is connected to the first power supply voltage end, a second electrode of the third switch transistor is connected to the second electrode of the driving transistor, and a gate electrode of the third switch transistor is connected to the light-emitting control line;

a first electrode of the fourth switch transistor is connected to the first electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

7. The display panel according to claim 5, wherein the pixel circuit further comprises a fifth switch transistor;

a first electrode of the fifth switch transistor is connected to a first reset signal end, a second electrode of the fifth switch transistor is connected to the gate electrode of the driving transistor, and a gate electrode of the fifth switch transistor is connected to a first reset control end; and a first reset control end of the nth row of pixel circuits is connected to the write control line corresponding to the (n−1)th row of pixel circuits.

8. The display panel according to claim 5, wherein the pixel circuit further comprises a sixth switch transistor;

a first electrode of the sixth switch transistor is connected to a second reset signal end, a second electrode of the sixth switch transistor is connected to the anode of the light-emitting device, and a gate electrode of the sixth switch transistor is connected to a second reset control end; and a second reset control end of the nth row of pixel circuits is connected to the write control line corresponding to the (n−1)th row of pixel circuits, or the second reset control end of the nth row of pixel circuits is connected to the write control line corresponding to the nth row of pixel circuits.

9. The display panel according to claim 1, wherein the first driving circuit comprises a first driving sub-circuit and a second driving sub-circuit, the first driving sub-circuit is connected to the odd-numbered compensation control line; and the second driving sub-circuit is connected to the even-numbered compensation control line.

10. A driving method for the display panel according to claim 1, comprising:

providing, by a second driving circuit, write control signals for an nth row to an (n+N−1)th row of pixel circuits row by row in a period in response to a first driving circuit providing a compensation control signal for the nth row of pixel circuits.

11. A display device, comprising a control circuit and a display panel, wherein the display panel, comprising: a plurality of pixel circuits arranged in a matrix, a plurality of data lines, a plurality of write control lines, a plurality of compensation control lines, a first driving circuit connected to the plurality of compensation control lines, and a second driving circuit connected to the plurality of write control lines, wherein each column of pixel circuits corresponds to one data line, and each row of pixel circuits corresponds to one write control line and one compensation control line;

the pixel circuit comprises: a driving transistor, a first switch transistor, a second switch transistor, a first capacitor and a second capacitor, wherein the first switch transistor is configured to short-circuit a gate electrode of the driving transistor and a second electrode of the driving transistor under control of a corresponding compensation control line; the second switch transistor is configured to write a signal of a corresponding data line to a first electrode of the driving transistor under control of a corresponding write control line; and the first capacitor is connected between the gate electrode of the driving transistor and a first power supply voltage end, and the second capacitor is connected between the first electrode of the driving transistor and the first power supply voltage end;

the first driving circuit is configured to output compensation control signals to each row of pixel circuits in sequence by means of the plurality of compensation control lines, and the second driving circuit is configured to output write control signals to each row of pixel circuits in sequence by means of the plurality of write control lines; and a pulse width of the compensation control signals is equal to N times a pulse width of the write control signals, the write control signals on two adjacent write control lines do not overlap, and an overlap time of the compensation control signals on two adjacent compensation control lines is equal to (N−1)/N of the pulse width of the compensation control signals, N being an integer greater than 1; and the compensation control signals and the write control signals loaded on a same row pixel circuits overlap;

the control circuit is connected to the display panel and is configured to control the display panel for display.

12. The display device according to claim 11, wherein N is equal to 2.

13. The display device according to claim 11, wherein a ratio of a capacitance of the second capacitor to a capacitance of the first capacitor is greater than or equal to 0.5 and less than or equal to 1.5.

14. The display device according to claim 11, wherein a first electrode of the first switch transistor is connected to the gate electrode of the driving transistor, a second electrode of the first switch transistor is connected to the second electrode of the driving transistor, and a gate electrode of the first switch transistor is connected to the compensation control line; and a first electrode of the second switch transistor is connected to the data line, a second electrode of the second switch transistor is connected to the first electrode of the driving transistor, and a gate electrode of the second switch transistor is connected to the write control line.

15. The display device according to claim 11, wherein the display panel further comprising a plurality of light-emitting control lines and a third driving circuit connected to the plurality of light-emitting control lines;

each light-emitting control line corresponds to one row of pixel circuits, and each pixel circuit further comprises a third switch transistor and a fourth switch transistor;

a first electrode of the third switch transistor is connected to the first power supply voltage end, a second electrode of the third switch transistor is connected to the first electrode of the driving transistor, and a gate electrode of the third switch transistor is connected to the light-emitting control line;

a first electrode of the fourth switch transistor is connected to the second electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

16. The display device according to claim 11, wherein the display panel further comprising a plurality of light-emitting control lines and a third driving circuit connected to the plurality of light-emitting control lines;

each light-emitting control line corresponds to one row of pixel circuits, and each pixel circuit further comprises a third switch transistor and a fourth switch transistor;

a first electrode of the third switch transistor is connected to the first power supply voltage end, a second electrode of the third switch transistor is connected to the second electrode of the driving transistor, and a gate electrode of the third switch transistor is connected to the light-emitting control line;

a first electrode of the fourth switch transistor is connected to the first electrode of the driving transistor, a second electrode of the fourth switch transistor is connected to an anode of a light-emitting device, and a gate electrode of the fourth switch transistor is connected to the light-emitting control line; and the third driving circuit is configured to output light-emitting control signals to each row of pixel circuits in sequence by means of the plurality of light-emitting control lines.

17. The display device according to claim 15, wherein the pixel circuit further comprises a fifth switch transistor;

a first electrode of the fifth switch transistor is connected to a first reset signal end, a second electrode of the fifth switch transistor is connected to the gate electrode of the driving transistor, and a gate electrode of the fifth switch transistor is connected to a first reset control end; and a first reset control end of the nth row of pixel circuits is connected to the write control line corresponding to the (n−1)th row of pixel circuits.

18. The display device according to claim 15, wherein the pixel circuit further comprises a sixth switch transistor;

a first electrode of the sixth switch transistor is connected to a second reset signal end, a second electrode of the sixth switch transistor is connected to the anode of the light-emitting device, and a gate electrode of the sixth switch transistor is connected to a second reset control end; and a second reset control end of the nth row of pixel circuits is connected to the write control line corresponding to the (n−1)th row of pixel circuits, or the second reset control end of the nth row of pixel circuits is connected to the write control line corresponding to the nth row of pixel circuits.

19. The display panel device to claim 11, wherein the first driving circuit comprises a first driving sub-circuit and a second driving sub-circuit, the first driving sub-circuit is connected to the odd-numbered compensation control line; and the second driving sub-circuit is connected to the even-numbered compensation control line.

* * * * *